(12) United States Patent
Kubota

(10) Patent No.: US 9,809,714 B2
(45) Date of Patent: *Nov. 7, 2017

(54) ANTIREFLECTION COATING FILM AND ANTIREFLECTION COATING MATERIAL FOR OPTICAL ELEMENT AND OPTICAL ELEMENT

(71) Applicant: CANON KABUSHIKI KAISHA, Tokyo (JP)

(72) Inventor: Reiko Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 14/322,790

(22) Filed: Jul. 2, 2014

(65) Prior Publication Data

US 2014/0323612 A1  Oct. 30, 2014

Related U.S. Application Data

(63) Continuation of application No. 13/578,063, filed as application No. PCT/JP2011/053313 on Feb. 9, 2011, now Pat. No. 8,809,421.

(30) Foreign Application Priority Data

Feb. 12, 2010  (JP) .................................. 2010-029513
Jan. 7, 2011  (JP) .................................. 2011-002164

(51) Int. Cl.
| C08K 7/00 | (2006.01) |
| C09D 5/00 | (2006.01) |
| C09D 7/12 | (2006.01) |
| G02B 1/111 | (2015.01) |
| C08K 3/22 | (2006.01) |
| C08K 3/34 | (2006.01) |

(52) U.S. Cl.
CPC ............ *C09D 5/006* (2013.01); *C09D 7/1216* (2013.01); *C09D 7/1266* (2013.01); *G02B 1/111* (2013.01); *C08K 3/22* (2013.01); *C08K 3/34* (2013.01)

(58) Field of Classification Search
CPC .... C09D 5/006; C09D 7/1275; C09D 163/00; C08K 3/36
See application file for complete search history.

(56) References Cited

U.S. PATENT DOCUMENTS

| 8,809,421 B2* | 8/2014 | Kubota .................. G02B 1/111 252/582 |
| 8,958,155 B2* | 2/2015 | Kubota .................. G02B 1/04 252/582 |
| 2008/0174871 A1* | 7/2008 | Ukuda .................. G02B 5/189 359/576 |
| 2009/0128912 A1* | 5/2009 | Okada ...................... C08J 7/047 359/576 |
| 2015/0125689 A1* | 5/2015 | Kubota ................. G01N 21/39 428/328 |
| 2016/0231563 A1* | 8/2016 | Teramoto ................ G02B 1/111 |

* cited by examiner

*Primary Examiner* — Hannah Pak
(74) *Attorney, Agent, or Firm* — Canon U.S.A. Inc., IP Division

(57) ABSTRACT

An antireflection coating film for an optical element is provided on a surface of a substrate of an optical material and includes first particles having a refractive index (nd) of at least 2.2 or more for the d-line and an average particle size of 10 to 70 nm, second particles of at least one of silica and sericite and having an average particle size of 1 to 11 μm, a colorant of an organic substance and soluble in an organic solvent, and a resin, in which the first particle content is in the range of 10% to 35% by weight, and second particle content is in the range of 1% to 11% by weight. The antireflection coating film has a high effect of preventing surface reflection, a high effect of preventing inner-surface reflection, satisfactory absorption of visible light, and low levels of reflection and scattering in the film.

18 Claims, 5 Drawing Sheets

ANTIREFLECTION COATING FILM AND ANTIREFLECTION COATING MATERIAL FOR OPTICAL ELEMENT AND OPTICAL ELEMENT

CROSS REFERENCE TO RELATED APPLICATIONS

This application is a Continuation of U.S. patent application Ser. No. 13/578,063 filed Aug. 9, 2012, which was a 371 national stage entry of International Application No. PCT/JP2011/053313, filed Feb. 9, 2011, and which claims priority to Japanese Patent Application No. 2011-002164 filed Jan. 7, 2011 and Japanese Patent Application No. 2010-029513 filed on Feb. 12, 2010, all of which are hereby incorporated by reference herein in their entireties.

TECHNICAL FIELD

The present invention relates to an antireflection coating film and an antireflection coating material for an optical element for use in optical apparatuses, such as cameras, binoculars, and microscopes, and an optical element.

BACKGROUND ART

Antireflection coating films for optical elements are mainly formed on glass and plastic. Optical elements may be lenses, prisms, or another optical glass. Here, an optical element will be described by taking a lens as an example.

As illustrated in FIG. 1, an antireflection coating film 1 for an optical element may be formed on any portion of the circumference of a lens 2 serving as an optical element. Like incident light 3, in the case where light is incident on only the lens 2, the light comes through the lens 2 to emerge as transmitted light 4. In contrast, in the case where obliquely incident light 5 enters the lens 2, the light is incident on the antireflection coating film 1. In this case, if the antireflection coating film 1 is not arranged, light incident on the circumference of the lens 2 undergoes inner-surface reflection to emerge as internally reflected light 6 that is not related to an image from the lens 2, thereby causing, for example, flare and a ghost image and degrading the image. The arrangement of the antireflection coating film 1 reduces the inner-surface reflection of the obliquely incident light 5 to reduce the internally reflected light 6 that adversely affects an image, thereby preventing the formation of flare and a ghost images.

In recent years, with a trend toward miniaturization and higher performance of lenses, lenses with high refractive indices have been developed. Higher refractive indices of lenses require higher refractive indices of antireflection coating films.

With respect to a method for preventing inner-surface reflection, PTL 1 discloses a method in which coal tar is used to improve a refractive index and in which light is absorbed by the color of coal tar itself. Furthermore, PTL 2 discloses a method in which an antireflection coating film having a higher refractive index is provided using inorganic fine particles having a high refractive index and in which light is absorbed by black fine particles.

CITATION LIST

Patent Literature

PTL 1 Japanese Patent Publication No. 47-32419
PTL 2 Japanese Patent Laid-Open No. 07-82510

SUMMARY OF INVENTION

Technical Problem

To prevent inner-surface reflection as described above, the refractive index of an antireflection coating film for an optical element needs to be brought close to the refractive index of glass, the antireflection coating film needs to be black to absorb light, and light that is absorbed in the antireflection coating film for an optical element must not be reflected or scattered.

However, an antireflection coating film for an optical element described in PTL 1 is brownish black. Thus, the effect of preventing the inner-surface reflection varies depending on the wavelength of light. Furthermore, an organic substance has a limited refractive index. It is thus difficult to bring the refractive index of the antireflection coating film close to a glass having a high refractive index.

An antireflection coating film for an optical element described in PTL 2 includes nanosized fine particles having a high refractive index and black fine particles. Typically, black fine particles contain aggregates. The aggregates cause reflection and scattering of light. Light that is absorbed by the film leaks to the outside, disadvantageously causing a reduction in reflectance.

An antireflection coating film described in PTL 2 has a high refractive index. In the case where incident light 7, which is directly incident on the antireflection coating film illustrated in FIG. 1, is incident on the antireflection coating film, the light is reflected from a surface of the antireflection coating film 1 to adversely affect an image, in some cases. To prevent surface reflection, there is a method for roughening a surface by the addition of particles. However, the addition of particles configured to prevent surface reflection to nanosized fine particles having a high refractive index reduces the refractive index of a film, disadvantageously causing the degradation of inner-surface reflection.

The present invention has been accomplished in light of the circumstances described above. Aspects of the present invention provide an antireflection coating film for an optical element, the antireflection coating film having a high effect of preventing surface reflection, a high effect of preventing inner-surface reflection, satisfactory absorption of visible light, and low levels of reflection and scattering in the film, and provides an antireflection coating material and an optical element including the antireflection coating film.

Solution to Problem

To overcome the foregoing problems, an antireflection coating film for an optical element according to one aspect of the invention is provided on a surface of a substrate composed of an optical material and includes first particles having a refractive index (nd) of at least 2.2 or more for the d-line and an average particle size of 10 nm to 70 nm, second particles composed of at least one of silica and sericite and having an average particle size of 1 μm to 11 μm, a colorant composed of an organic substance and soluble in an organic solvent, and a resin, in which the first particle content is in the range of 10% by weight to 35% by weight, and second particle content is in the range of 1% by weight to 11% by weight.

To overcome the foregoing problems, an antireflection coating material for an optical element according to one aspect of the invention includes an organic solvent, first particles having a refractive index (nd) of at least 2.2 or more for the d-line and an average particle size of 10 nm to 70 nm, second particles composed of at least one of silica and sericite, the second particles having an average particle size of 1 µm to 11 µm, a colorant composed of an organic substance and soluble in the organic solvent, and a resin, in which with respect to the solid content excluding the organic solvent, the first particle content is in the range of 10% by weight to 35% by weight, and second particle content is in the range of 1% by weight to 11% by weight.

Further features of the present invention will become apparent from the following description of exemplary embodiments with reference to the attached drawings.

DESCRIPTION OF EMBODIMENTS

Embodiments of the present invention will be described below.

First, the structure of an antireflection coating film according to aspects of the present invention will be described.

An antireflection coating film for an optical element according to aspects of the present invention is provided on a surface of a substrate composed of an optical material and includes first particles having a refractive index (nd) of at least 2.2 or more for the d-line and an average particle size of 10 nm to 70 nm, second particles composed of at least one of silica and sericite, the second particles having an average particle size of 1 µm to 11 µm, a colorant composed of an organic substance and soluble in an organic solvent, and a resin, in which the first particle content is in the range of 10% by weight to 35% by weight, and second particle content is in the range of 1% by weight to 11% by weight.

The term "antireflection coating film for an optical element" according to aspects of the present invention indicates only the solid content after curing with a curing agent unless otherwise specified. A solvent is evaporated and thus is not contained in the content. Furthermore, the term "antireflection coating material" according to aspects of the present invention indicates a state before the addition of the curing agent.

The antireflection coating film for an optical element according to aspects of the present invention (hereinafter, simply referred to as an "antireflection coating film") is characterized by including the function of reducing inner-surface reflection and the function of reducing surface reflection. First, a structure capable of reducing inner-surface reflection will be described. Next, a structure capable of reducing surface reflection will be described. Finally, materials required to achieve these structures will be described.

Structure Configured to Reduce Inner-Surface Reflection

Figure 1:
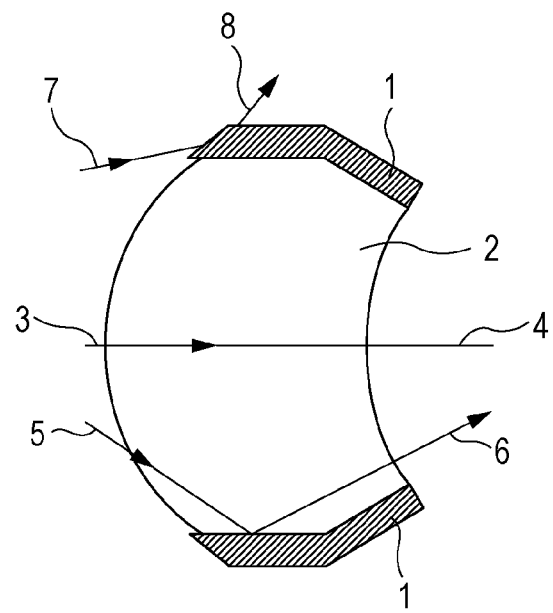
FIG. 1 is a schematic view of an antireflection coating film for an optical element according to aspects of the present invention.
Figure 2:
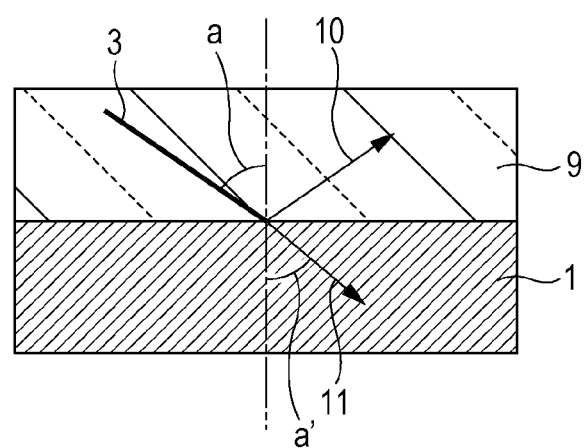
FIG. 2 is a schematic view of the propagation of internally reflected light.
Figure 3A:
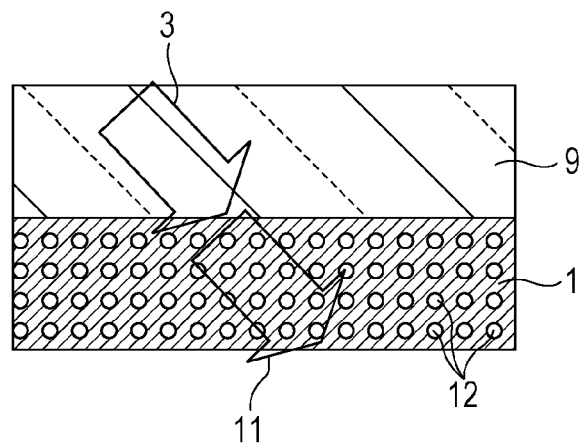
FIG. 3A is a schematic view of an ideal antireflection coating film.
Figure 3B:
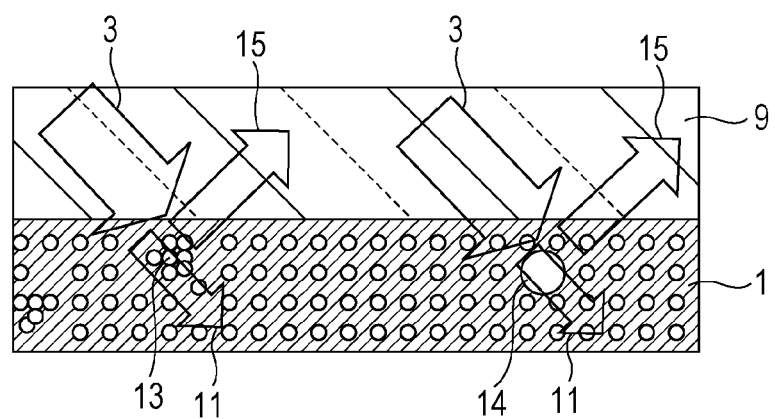
FIG. 3B is a schematic view of an antireflection coating film having a high degree of the reflection of refracted light.

The principle of inner-surface reflection will now be described. FIG. 2 is a schematic view of the propagation of internally reflected light. FIG. 3A is a microscopically enlarged schematic view of the structure of an ideal antireflection coating film for refracted light illustrated in FIG. 2. FIG. 3B is a microscopically enlarged schematic view of the structure of an antireflection coating film having a high degree of the reflection of the refracted light illustrated in FIG. 2. In the figures, reference numeral 9 denotes glass, reference numeral 10 denotes reflected light, reference numeral 11 denotes refracted light, reference numeral 12 denotes first particles, reference numeral 13 denotes a first-particle aggregate, reference numeral 14 denotes a coarse first particle, reference numeral 15 denotes the reflection of the refracted light, and reference numeral 16 denotes second particles.

The propagation of internally reflected light will be described below with reference to FIG. 2. The incident light 3 enters the glass 9 and is divided at the interface between the glass 9 and the antireflection coating film 1 into the reflected light 10 and the refracted light 11. Description will be separated into two cases: the case where the incident light 3 is incident at an incident angle equal to or greater than the critical angle; and the case where the incident light 3 is incident at an incident angle smaller than the critical angle.

In the case where the incident angle a is equal to or greater than the critical angle, a' is 90° or more. Thus, the incident light 3 is not refracted but completely reflected to emerges as the reflected light 10. A state in which all incident light is reflected is referred to as total reflection. In the total reflection state, the critical angle θ (∠a in FIG. 2) when light is incident from the glass 9 (medium A) to the antireflection coating film 1 (medium B) is determined from expression (1) described below. A reflectance R in the total reflection state is determined from expression (2) described below. Expression (2) demonstrates that at an angle equal to or greater than the critical angle, the reflectance can be reduced as the refractive index of the antireflection coating film 1 is brought closer to the refractive index of the glass 9. Thus, in the case where, for example, a lens having a high refractive index is used, the use of nanosized fine particles having a high refractive index enables the antireflection coating film to have a higher refractive index, thereby reducing the reflectance at the angle equal to or greater than the critical angle:

$$\sin \theta = n_A/n_B \qquad \text{expression (1)}$$

(where $\sin \theta$ represents the critical angle, $n_A$ represents the refractive index of the antireflection coating film, and $n_B$ represents the refractive index of the glass); and $$R = ((n_A - n_B)^2/(n_A + n_B)^2) \times 100 \qquad \text{expression (2)}$$

(where R represents reflectance).

At an angle smaller than the critical angle, the incident light 3 is divided into the reflected light 10 and the refracted light 11. In this case, a smaller incident angle a results in a reduction in the proportion of the reflected light 10 and an increase in the proportion of the refracted light 11. In contrast, a greater incident angle a results in an increase in the proportion of the reflected light 10 and a reduction in the proportion of the refracted light 11.

A structure configured to reduce inner-surface reflection according to aspects of the present invention will be described in detail below with reference to FIGS. 3A and 3B. The antireflection coating film 1 illustrated in FIG. 3A contains the first particles 12 in order to increase the refractive index. In this case, the incident light 3 is incident on the interface between the glass 9 and the antireflection coating film 1 to form the refracted light 11. Here, although the reflected light 10 is also formed, descriptions and illustrations are omitted. Furthermore, the second particles are not illustrated because the second particles will be described below. The first particles illustrated in FIG. 3A are uniformly dispersed. Thus, the refracted light 11 is absorbed by a colorant (not illustrated), which is composed of an organic substance and soluble in an organic solvent, in the antireflection coating film 1.

For purpose of comparison, FIG. 3B is a microscopically enlarged schematic view of the structure of an antireflection coating film having a high degree of the reflection of refracted light. The first particles contained in the antireflection coating film 1 illustrated in FIG. 3B are not in a monodispersed state and contain, for example, the first-particle aggregate 13 and the coarse first particle 14, which has an inherently large size. In this case, the incident light 3 is incident on the antireflection coating film 1 to form the refracted light 11 at the interface between the glass 9 and the antireflection coating film 1. However, the presence of the first-particle aggregate 13 and the coarse first particle 14 causes the reflection 15 of the light therefrom. Here, the reflection 15 of the refracted light is significantly caused at a particle size of 100 nm or more. Thus, the first particles can minimize the proportion of particles each having a particle size of 100 nm or more.

Note that the particle size of each second particle is sufficiently larger than that of each first particle. Thus, the second particles do not approach the interface between the glass 9 and the antireflection coating film 1. So, the second particles do not strongly associated with the reflection 15 of the refracted light if the second particle content is not higher than necessary.

Structure Configured to Reduce Surface Reflection

A reduction in surface reflection will be described below.

Figure 4A:
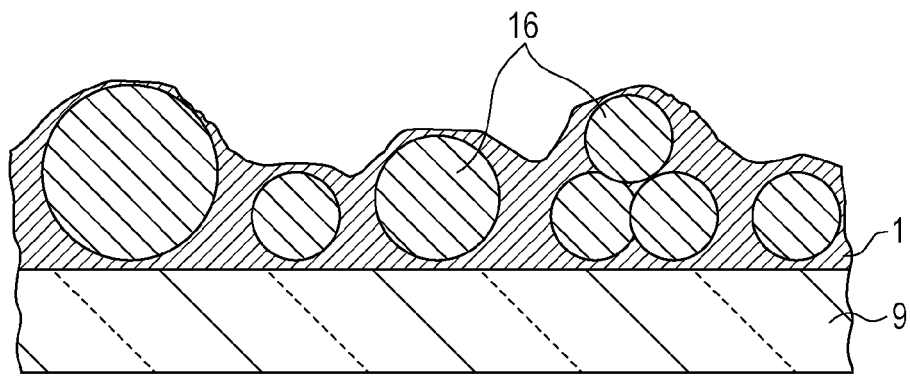
FIG. 4A is a schematic view of a structure configured to reduce surface reflection.

Surface reflection is reduced by surface irregularities because of scattering of incident light. To reduce surface reflection, it is thus necessary to form irregularities having an appropriate height. To form the irregularities having an appropriate height, according to aspects of the present invention, the second particles 16 are dispersed in the antireflection coating film 1 as illustrated in FIG. 4A.

Figure 4B:
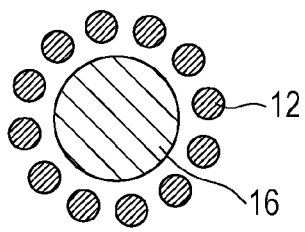
FIG. 4B is a schematic view illustrating the relationship between the particle size of first particles and the particle size of a second particle.
Figure 4C:
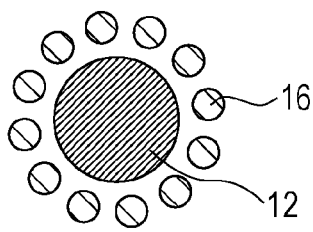
FIG. 4C is a schematic view illustrating another relationship between the particle size of the first particle and the particle size of the second particles.

Next, the relationship between the particle size of the first particles and the particle size of the second particles will be described. FIG. 4B is a schematic view illustrating the relationship that can reduce the inner-surface reflection. FIG. 4C is a schematic view illustrating another relationship between the particle size of the first particle and the particle size of the second particles. According to aspects of the present invention, the particle size of the first particles can be smaller than that of the second particles. Typically, fine particles are adsorbed around large particles. In the case where the particle size of the first particles is smaller than that of the second particles, as illustrated in FIG. 4B, the first particles 12 are arranged around the second particle 16. In contrast, as illustrated in FIG. 4C, in the case where the particle size of the first particles is larger than that of the second particles, the second particles 16 are arranged around the first particle 12. The refractive index is strongly affected by the properties of the particles located outside and is not so strongly affected by the properties of the particles located inside. Thus, the structure illustrated in FIG. 4B in which the first particles 12 are arranged outside is more effective in improving the refractive index.

Material Configuration

Next, materials used to reduce the inner-surface reflection and the surface reflection from the antireflection coating film will be described.

Examples of the first particles include dispersions of nanosized fine particles composed of, for example, titania, zirconia, alumina, yttria, cadmium oxide, diamond, strontium titanate, and germanium.

A material for the first particles can have a refractive index (nd) of 2.2 or more and preferably 2.2 to 3.5 for the d-line. The use of the first particles having a refractive index of less than 2.2 results in a small increase in the refractive index of the antireflection coating film. This increases the difference in refractive index between the antireflection coating film and a substrate, thereby increasing reflection.

The first particles have an average particle size of 10 nm to 70 nm and preferably 10 nm to 20 nm. The first particles can have a smaller average particle size. The practical lower limit is about 10 nm in light of the level of dispersion techniques. An average particle size exceeding 70 nm can fail to efficiently improve the refractive index.

Note that the particle size of the first particles is defined as the particle size of particles practically present in the antireflection coating film. For example, if the first particles are aggregated, the particle size is defined as the size of the aggregate. In this case, the first particles can have a particle size of 100 nm or less and can be uniformly dispersed. Even if the average particle size is small, the presence of an aggregate or a coarse particle having a size of 100 nm or more causes scattering. Thereby, refracted light incident from the glass to the antireflection coating film is not absorbed but is reflected. The percentage by number of particles having a particle size of 100 nm or more in the first particles can be 0.3% or less. If the percentage by number of particles having a particle size of 100 nm or more in the first particles with a refractive index nd of 2.2 or more exceeds 0.3%, the refracted light is not absorbed by the antireflection coating film to increase the reflection.

The first particle content of the first particles contained in the antireflection coating film according to aspects of the present invention is in the range of 10% by weight to 35% by weight and preferably 28% by weight to 34% by weight. A first particle content of less than 10% by weight results in a small increase in refractive index, thereby increasing the inner-surface reflection. A first particle content exceeding 35% by weight results in reductions in the adhesion and durability of the coating film.

A material for the second particles is not limited so long as the second particles composed of the material are capable of adsorbing the first particles thereon. For example, the second particles can be composed of silica, sericite, or a mixture thereof. Note that quartz is a type of silica and included in silica.

The second particles have an average particle size of 1 μm to 11 μm and preferably 9 μm to 11 μm. An average particle size of less than 1 µm results in a low peak-to-valley height, thereby causing difficulty in preventing the surface reflection. An average particle size exceeding 11 µm results in a reduction in surface reflection but results in large variations in thickness, thereby causing difficulty in forming the coating film with high accuracy.

The second particle content of the antireflection coating film according to aspects of the present invention is in the range of 1% by weight to 11% by weight and preferably 9% by weight to 11% by weight. A second particle content of less than 1% by weight results in a low effect of preventing the surface reflection. A second particle content exceeding 11% by weight results in reductions in adhesion and durability.

The colorant composed of an organic substance and soluble in an organic solvent is typically a dye. An organic substance that is not categorized into dye may also be used so long as it uniformly absorbs visible light in the wavelength range of 400 nm to 700 nm, is transparent, and is soluble in a solvent. When a colorant categorized into a pigment, such as carbon black, insoluble in an organic solvent is formed into aggregates having a size of 100 nm or more, the aggregates reflect the refracted light to cause reflection and scattering.

The ratio of the minimum absorbance to the maximum absorbance (minimum absorbance/maximum absorbance) of the antireflection coating film according to aspects of the present invention in the wavelength range of 400 nm to 700 nm is 0.7 or more and preferably 0.8 or more. A ratio of the minimum absorbance to the maximum absorbance of less than 0.7 in the wavelength range of 400 nm to 700 nm results in the deterioration of the inner-surface reflection at a wavelength at which the absorbance is low. Furthermore, the resulting product is not black and thus is reduced in quality. To achieve a ratio of the minimum absorbance to the maximum absorbance of 0.7 or more in the wavelength range of 400 nm to 700 nm, one type of dye may be used. Alternatively, several types of dyes, such as black, red, yellow, and blue, may be mixed to adjust the absorption. However, the use of a pigment having a large particle size can cause scattering. Note that a black level according to the present invention indicates the ratio of the minimum absorbance to the maximum absorbance for light in the wavelength range of 400 nm to 700 nm. In the present invention, the "black" of a black pigment and black inorganic particles indicates that they have a black level of 0.7 or more.

The proportion of the colorant, which is composed of an organic substance and soluble in an organic solvent, in the antireflection coating film according to aspects of the present invention can be in the range of 5% by weight to 30% by weight and preferably 10% by weight to 25% by weight.

The resin that has satisfactory adhesion to a substrate, such as glass, can be used. To improve the refractive index of the entire film, the resin can have a high refractive index. Non-limiting examples of a material having a high refractive index and satisfactory adhesion to glass include epoxy resins, urethane resins, acrylic resins, melamine resins, and vinylidene chloride.

The resin content of the antireflection coating film according to aspects of the present invention is in the range of 30% by weight to 80% by weight and preferably 30% by weight to 60% by weight.

Method for Producing Antireflection Coating Material

An antireflection coating material for an optical element according to aspects of the present invention includes first particles having a refractive index (nd) of at least 2.2 or more for the d-line and an average particle size of 10 nm to 70 nm, second particles composed of at least one of silica and sericite, the second particles having an average particle size of 1 µm to 11 µm, a colorant composed of an organic substance and soluble in the organic solvent, a resin, and an organic solvent, in which with respect to the solid content excluding the organic solvent, the first particle content is in the range of 10% by weight to 35% by weight, and second particle content is in the range of 1% by weight to 11% by weight. Furthermore, another component may be contained.

The first particles, the second particles, the colorant, and the resin contained in the antireflection coating material according to aspects of the present invention (hereinafter, simply referred to as an "antireflection coating material") are as defined in the antireflection coating film.

With respect to the organic solvent contained in the antireflection coating material according to aspects of the present invention, any organic solvent may be used so long as the first particles and the second particles are dispersed therein and the dye is soluble in the organic solvent. Non-limiting example of the organic solvent include toluene, hexane, cyclohexane, xylene, 1-butanol, butyl acetate, ethyl acetate, and methyl isobutyl ketone (MIBK).

The organic solvent content of the antireflection coating material according to aspects of the present invention can be in the range of 30% by weight to 70% by weight with respect to 100% by weight of the total weight of the antireflection coating material.

The antireflection coating film is formed by curing the antireflection coating material.

A slurry in which the first particles are dispersed in an organic solvent may be used as the first particles. A commercially available slurry may be used. Examples of a method for producing a slurry include a method in which nanosized fine particles are dispersed with a bead mill or an impact dispersion apparatus; and a method in which a slurry is prepared by a sol-gel method. Furthermore, when the slurry is prepared, any surface treatment may be performed, and any dispersant may be added.

The first particles can be composed of titania, zirconia, alumina, or yttria, which has a high refractive index and high transparency. Any organic solvent may be used as a solvent for the slurry. Examples thereof include methyl isobutyl ketone, acetone, thinner, and ethanol.

The second particles can have an average particle size of 1 µm to 11 µm and is composed of silica or sericite.

The colorant composed of an organic substance and soluble in an organic solvent can be a dye and have a ratio of the minimum absorbance to the maximum absorbance of 0.7 or more in the wavelength range of 400 nm to 700 nm.

With respect to the resin, a resin having a high refractive index and high adhesion to a substrate, such as glass, can be used. An example thereof is an epoxy resin.

With respect to additional components, for example, any coupling agent configured to improve the adhesion to glass, any fungicide, and additional particles may be contained in the coating material to the extent that the optical performance is not significantly reduced.

Examples of the additional particles include particles having a refractive index nd of 2.2 or less and a particle size of 0.1 µm or less, which do not contribute to scattering.

An optical element according to aspects of the present invention includes the antireflection coating film described above. Specific examples of the optical element provided with the antireflection coating film include lenses and prisms.

The optical element according to aspects of the present invention includes the antireflection coating film described above and thus has a high effect of preventing surface reflection, a high effect of preventing inner-surface reflection, sufficiently absorbs visible light, and low levels of reflection and scattering in the film.

EXAMPLES

Examples according to the present invention will be described below.

Examples 1 to 5

In Examples 1 to 5, the preparation of antireflection coating materials, the production of antireflection coating films, and the evaluation of optical properties were performed by methods described below.

Preparation of Antireflection Coating Material

Tables 1 and 2 illustrate first-particle slurries, colorants each composed of an organic substance and soluble in an organic solvent, second particles, a resin, a solvent, a coupling agent, and mixing ratios thereof, these components being contained in antireflection coating materials A, B, C, D, and E.

The antireflection coating material A was used in Example 1. The antireflection coating material B was used in Example 2. The antireflection coating material C was used in Example 3. The antireflection coating material D was used in Example 4. The antireflection coating material E was used in Example 5.

A method for preparing each antireflection coating material is described below.

First, 70 g of the first-particle slurry, 1 g of a black dye, 3 g of a yellow dye, and 2 g of a red dye, which are colorants soluble in an organic solvent, 5 g of the second particles, 10 g of the resin, and 3 g of the coupling agent were charged into a ball mill pot. Subsequently, five ceramic balls each having a diameter of 20 mm were charged into the ball mill pot. As the resin, an epoxy resin (Epikote 828, manufactured by Japan Epoxy Resins Co., Ltd.) was used. As the coupling agent, an epoxy-based silane coupling agent (KBM-403, manufactured by Shin-Etsu Chemical Co., Ltd). The ball mill pot containing the mixture and the ceramic balls was set to a roll coater and rotated at 66 rpm for 48 hours, thereby preparing an antireflection coating material.

The organic dyes used were selected from dyes described below.

The black dye used was selected from VALIFAST BLACK 1821 (manufactured by Orient Chemical Industries Co., Ltd.), VALRFAST BLACK 3810 (manufactured by Orient Chemical Industries Co., Ltd.), Oil Black HBB (manufactured by Orient Chemical Industries Co., Ltd.), and Aizen Spilon Black MHS-Liquid (manufactured by Hodogaya Chemical Co., Ltd).

The red dye used was selected from VALIFAST RED 3320 (manufactured by Orient Chemical Industries Co., Ltd.) and Aizen Spilon Red BEH S-liquid (manufactured by Hodogaya Chemical Co., Ltd).

The yellow dye used was selected from OIL YELLOW 129, VALIFAST YELLOW 3108, and Aizen Spilon Yellow RH S-Liquid (manufactured by Hodogaya Chemical Co., Ltd).

Measurement of Average Particle Size

The average particle size was measured with a dynamic light scattering apparatus (Zeta sizer Nano MPT-2, manufactured by Sysmex Corporation). The first-particle slurry diluted with methyl isobutyl ketone (MIBK) was placed in a cell. Measurement was performed 20 times at a voltage of 5 mV, and then a mean value was calculated. The average particle size was defined as a peak value in the resulting number distribution.

Production of Antireflection Coating Film

First, 10 g of a curing agent was added to 94 g of the antireflection coating material. The resulting mixture was agitated with a roll coater for 30 minutes at 66 rpm. As the curing agent, an amine-based curing agent (Adeka Hardener EH551CH, manufactured by Adeka Corporation) was used.

The resulting mixture containing the antireflection coating material and the curing agent was applied on a glass substrate or a prism for evaluation in such a manner that a predetermined thickness was achieved, and then dried at room temperature for 60 minutes. After the completion of the drying of the antireflection coating material, curing was performed in a constant-temperature oven at 80° C. for 90 minutes, thereby forming an antireflection coating film.

Evaluation of Optical Properties

Method for Measuring Internal Reflectance

Figure 5A:
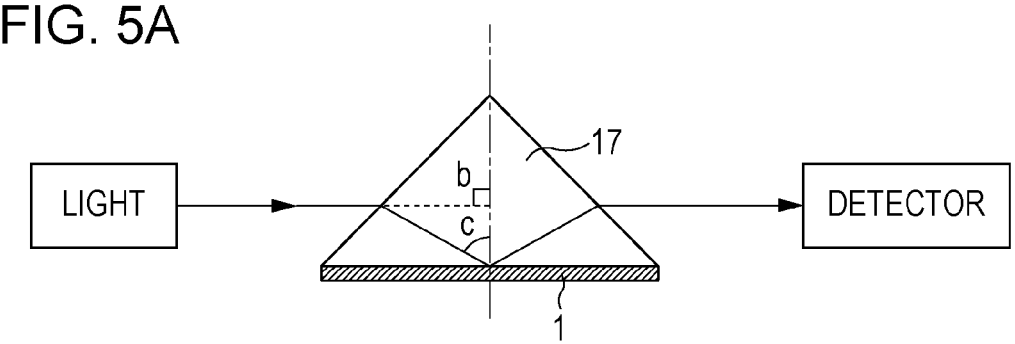
FIG. 5A is a schematic view illustrating a method for measuring internal reflectance when light is incident on a triangular prism at an incident angle b of 90°.
Figure 5B:
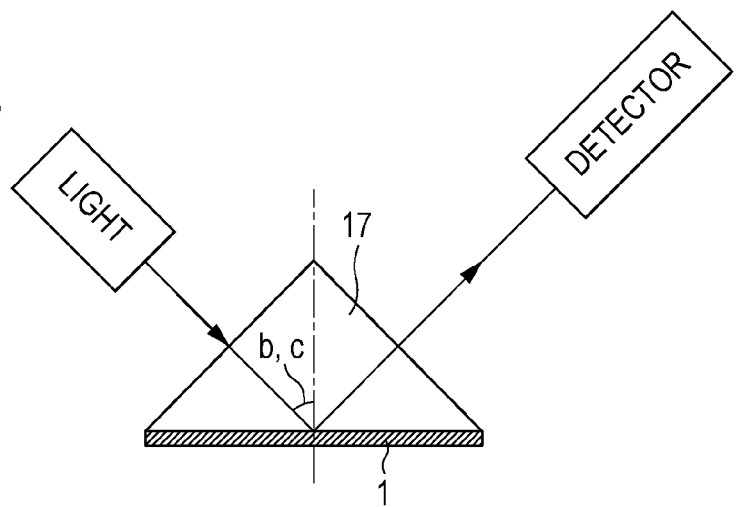
FIG. 5B is a schematic view illustrating a method for measuring internal reflectance when light is incident on a triangular prism at an incident angle b of 45°.
Figure 5C:
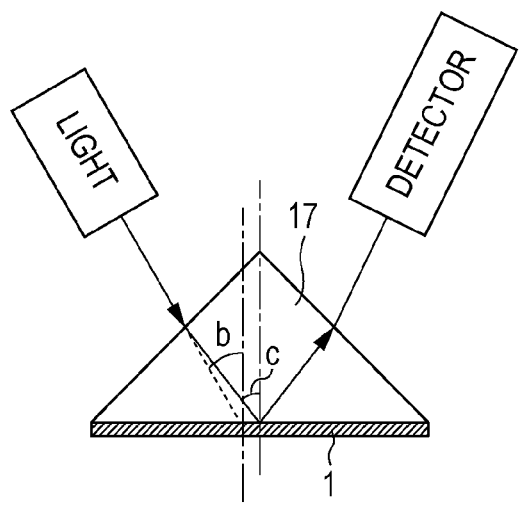
FIG. 5C is a schematic view illustrating a method for measuring internal reflectance when light is incident on a triangular prism at an incident angle b of 30°.

The internal reflectance was measured with an ASP spectrometer (ASP-32, manufactured by Bunkoukeiki Co., Ltd.) as illustrated in FIGS. 5A to 5C. A triangular prism was used as a measurement sample. Reference numeral 17 denotes a prism. In the triangular prism, a side that forms a right angle with a side was 30 mm, and the thickness was 10 mm. The prism was composed of S—LaH 53 (nd=1.8).

FIG. 5A is a schematic view illustrating a method for measuring the internal reflectance when light is incident on the triangular prism at an incident angle b of 90°. Referring to FIG. 5A, a method for measuring the internal reflectance with the ASP spectrometer will be described below. For the ASP spectrometer, the angle of a detector to the sample can be adjusted; hence, the internal reflectance can be measured for each incident angle. Light emitted from the ASP spectrometer is incident on the triangular prism at an incident angle b of 90°. At this time, the difference in refractive index between air and the prism causes refraction of the light. The incident angle c after the refraction is 68.13°. The angle e after refraction to the incident angle d was calculated from expression (3). Furthermore, the incident angle c was calculated from the angle e after refraction:

$$n = \sin d / \sin e \qquad \text{expression (3)}.$$

Subsequently, the refracted light impinges on the bottom of the triangular prism and is reflected therefrom to leave the triangular prism. The intensity of the reflected light was detected by the detector in the visible region, i.e., in the wavelength region of 400 nm to 700 nm. Note that a triangular prism having three specular surfaces of a bottom surface, an entrance surface, and a reflecting surface was used as a sample for a background, provided that no film was formed on the bottom surface. The internal reflectance was measured using a triangular prism having three specular surfaces of a bottom surface, an entrance surface, and a reflecting surface, each of the three specular surfaces being coated with an antireflection coating film. The values of the internal reflectance described in Table 3 were mean values calculated from values obtained by measuring the innersurface reflection for visible light in the wavelength range of 400 nm to 700 nm at intervals of 1 nm.

FIG. 5B is a schematic view illustrating a method for measuring the internal reflectance when light is incident on the triangular prism at an incident angle b of 45°. When the incident angle b at which light is incident on the triangular prism is 45°, the incident angle c after refraction is also 45°.

FIG. 5C is a schematic view illustrating a method for measuring the internal reflectance when light is incident on the triangular prism at an incident angle b of 30°. When the incident angle b at which light is incident on the triangular prism is 30°, the incident angle c after refraction is 36.73°.

Method for Measuring Surface Reflection

The surface reflectance was measured using a spectrophotometer, provided that the reflectance of a mirror at an incident angle of 5° was defined as 100%.

A sample for the measurement of the surface reflection was produced by forming an antireflection coating film on a flat glass plate. The flat glass plate had a width of 20 mm, a length of 50 mm, and a thickness of 1 mm and was composed of clear glass. The antireflection coating film was formed on an upper surface of the flat glass plate. In this case, the thickness of the antireflection coating film was adjusted to 10%. The mean value of the surface reflection for visible light in the wavelength range of 400 nm to 700 nm was calculated.

Method for Measuring Surface Roughness

The surface roughness Ra was measured using a surface roughness tester. A sample for the measurement of the surface roughness was produced by forming an antireflection coating film on a flat glass plate. The flat glass plate had a width of 20 mm, a length of 50 mm, and a thickness of 1 mm and was composed of clear glass. The antireflection coating film was formed on an upper surface of the flat glass plate. In this case, the thickness of the antireflection coating film was adjusted to 10 µm. The surface roughness was measured for 10 mm at a speed of 1 mm/s.

Percentage by Number of Particle with Size of 100 nm or More

A sample for the calculation of the percentage by number of particles with a size of 100 nm or more was produced by forming an antireflection coating film on a flat glass plate. The cross section of the sample was observed by TEM. The particles were classified by size using image processing. The particle size was calculated from the mean value of the aspect ratios. The image processing was performed in a 1 µm×1 µm square. Values at five points were averaged. The percentage by number of particles with a size of 100 nm or more was calculated from expression (4):

$$\text{Percentage by number of particles with size of 100 nm or more} = \left(\frac{\text{number of particles with size of 100 nm or more}}{\text{number of particles in 1 µm} \times \text{1 µm square}}\right) \times 100. \quad \text{expression (4)}$$

Method for Measuring Black Level

A black level indicates the ratio of the minimum absorbance to the maximum absorbance for visible light in the wavelength range of 400 nm to 700 nm. The transmittance was measured with a spectrophotometer, and the black level was calculated from expression (5):

$$\text{Black level} = \text{minimum absorbance/maximum absorbance} \quad \text{expression (5)}.$$

A sample for the measurement of the black level was produced by forming an antireflection coating film on a flat glass plate. The flat glass plate had a width of 20 mm, a length of 50 mm, and a thickness of 1 mm and was composed of clear glass. The antireflection coating film was formed on an upper surface of the flat glass plate. In this case, the thickness of the antireflection coating film was adjusted to 1.8 µm.

Performance when Lens Elements Including Antireflection Coating Films are Incorporated into Lens Barrel An antireflection coating film was formed on each telephoto lens elements. The telephoto lens elements were incorporated into a lens barrel. The telephoto lens including the antireflection coating films according to this example was attached to a camera, and then an image was taken. The resulting image was displayed and visually checked for the presence or absence of flare and a ghost image.

Evaluation Result

Tables 3 and 4 illustrate the measurement results of the internal reflectance, the surface reflection, the percentage by number of particles with a size of 100 nm or more, and the black level of the antireflection coating films A, B, C, D, and E and the antireflection coating materials by the measurement methods described above.

The first particles used in the produced antireflection coating materials had a refractive index nd of 2.2 or more.

With respect to the measurement results, the internal reflectance may be 20% or less when the incident angle after refraction is 68.13°. The internal reflectance may be 0.2% or less when the incident angle after refraction is 45°. The internal reflectance may be 1.0% or less when the incident angle after refraction is 36.73°. The surface roughness may be less than 10%. The surface reflectance may be 0.7 or less. The black level may be 0.7 or more. The percentage by number of particles having 100 nm or more in the first particles may be 0.3% or less.

As illustrated in Table 3, the physical properties of the coating material to prevent inner-surface reflection for an optical element and the film A according to Example 1 were measured. From the evaluation results of the optical properties, the internal reflectance was 5.99% at an incident angle of 68.13°, the internal reflectance was 0.14% at an incident angle of 45°, and the internal reflectance was 0.56% at an incident angle of 36.73°, which were all satisfactory. The surface roughness was 3 µm. The surface reflectance was 0.7%. That is, the surface state was satisfactory. The percentage by number of particles with a size of 100 nm or more in the first particles was 0.1% or less. The black level was 0.8, which was satisfactory. Telephoto lens elements including the antireflection coating films were assembled into a telephoto lens. The evaluation of the resulting image demonstrated that flare and a ghost image were not observed.

As illustrated in Table 3, the physical properties of the coating material to prevent inner-surface reflection for an optical element and the film B according to Example 2 were measured. In Example 2, zirconia (manufactured by Sumitomo Osaka Cement Co., Ltd.) was used as the first-particle slurry, unlike Example 1. From the evaluation results of the optical properties, the values of the internal reflectance were satisfactory at incident angles of 68.13°, 45°, and 36.73°. The surface roughness and the surface reflectance were both satisfactory. The percentage by number of particles with a size of 100 nm or more in the first particles was 0.1% or less. The black level was 0.7, which was satisfactory. Telephoto lens elements including the antireflection coating films were assembled into a telephoto lens. The evaluation of the resulting image demonstrated that flare and a ghost image were not observed.

As illustrated in Table 3, the physical properties of the coating material to prevent inner-surface reflection for an optical element and the film C according to Example 3 were measured. Unlike Example 1, in Example 3, the dispersant in the first-particle slurry was ND100, and titania (ND106, manufactured by Tayca Corp.), which is likely to aggregate in a coating material, was used. From the evaluation results of the optical properties, the values of the internal reflectance were satisfactory at incident angles of 68.13°, 45°, and 36.73°. The surface roughness and the surface reflectance were both satisfactory. The percentage by number of particles with a size of 100 nm or more in the first particles was 0.3%. The black level was 0.8, which was satisfactory. Telephoto lens elements including the antireflection coating films were assembled into a telephoto lens. The evaluation of the resulting image demonstrated that flare and a ghost image were not observed.

As illustrated in Table 4, the physical properties of the coating material to prevent inner-surface reflection for an optical element and the film D according to Example 4 were measured. Unlike Example 1, in Example 4, silica (Crystalite AA, manufactured by Tatsumori Ltd.) having a particle size of 10 μm was used as the second particles. From the evaluation results of the optical properties, the values of the internal reflectance were satisfactory at incident angles of 68.13°, 45°, and 36.73°. The surface roughness and the surface reflectance were both satisfactory. The percentage by number of particles with a size of 100 nm or more in the first particles was 0.1% or less. The black level was 0.8, which was satisfactory. Telephoto lens elements including the antireflection coating films were assembled into a telephoto lens. The evaluation of the resulting image demonstrated that flare and a ghost image were not observed.

As illustrated in Table 4, the physical properties of the coating material to prevent inner-surface reflection for an optical element and the film E according to Example 5 were measured. In Example 5, the proportions of a black dye, a yellow dye, and a red dye, which were colorants composed of organic substances and soluble in an organic solvent, were different from those in Example 1. From the evaluation results of the optical properties, the values of the internal reflectance were satisfactory at incident angles of 68.13°, 45°, and 36.73°. The surface roughness and the surface reflectance were both satisfactory. The percentage by number of particles with a size of 100 nm or more in the first particles was 0.1% or less. The black level was 0.6, which was lower than that in Example 1. Telephoto lens elements including the antireflection coating films were assembled into a telephoto lens. The evaluation of the resulting image demonstrated that flare and a ghost image were not observed.

TABLE 1

| | | | Coating material and film A to prevent inner-surface reflection for optical element | Coating material and film B to prevent inner-surface reflection for optical element | Coating material and film C to prevent inner-surface reflection for optical element |
|---|---|---|---|---|---|
| Coating material to prevent inner-surface reflection for optical element | First particle slurry | Material | Titania | Zirconia | Titania |
| | | Solvent | MIBK | MIBK | MIBK |
| | | Solid content | 25 wt % | 15 wt % | 25 wt % |
| | | Refractive index (solid content) | 2.7 | 2.2 | 2.7 |
| | | Average particle size | 20 nm | 10 nm | 20 nm |
| | | Model | ND100 | Nanosized zirconia dispersion | ND106 |
| | | Manufacturer | Tayca Corp. | Sumitomo Osaka Cement Co., Ltd. | Tayca Corp. |
| | | Amount added (g) | 70 | 90 | 70 |
| | | Solid content weight (g) | 17.5 | 13.5 | 17.5 |
| | Colorant composed of organic substance soluble in organic solvent | Material | Dye | Dye | Dye |
| | | Type | B: Black dye Y: Yellow dye R: Red dye | B: Black dye Y: Yellow dye R: Red dye | B: Black dye Y: Yellow dye R: Red dye |
| | | Amount added (g) | B: 3 Y: 2.25 R: 0.75 | B: 3 Y: 2.25 R: 0.75 | B: 3 Y: 2.25 R: 0.75 |
| | | Total amount added (g) | 6 | 6 | 6 |
| | Second particle | Material | Silica | Silica | Silica |
| | | Average particle size | 1 μm | 1 μm | 1 μm |
| | | Model | Crystalite 5X | Crystalite 5X | Crystalite 5X |
| | | Manufacturer | Tatsumori Ltd. | Tatsumori Ltd. | Tatsumori Ltd. |
| | | Amount added (g) | 5 | 5 | 5 |
| | Resin | Material | Epoxy | Epoxy | Epoxy |
| | | Amount added (g) | 10 | 10 | 10 |
| | Solvent | Material | — | — | — |
| | | Amount added (g) | — | — | — |
| | Coupling agent | Material | Epoxy-based silane coupling agent | Epoxy-based silane coupling agent | Epoxy-based silane coupling agent |
| | | Amount added (g) | 3 | 3 | 3 |
| | Curing agent | Material | Amine based | Amine based | Amine based |
| | | Amount added (g) | 10 | 10 | 10 |
| Coating film to prevent inner-surface reflection for optical element | | First particle content (%) | 34.0 | 28.4 | 34.0 |
| | | Second particle content (%) | 9.7 | 10.5 | 9.7 |

TABLE 2

|  |  |  | Coating material and film D to prevent inner-surface reflection for optical element | Coating material and film E to prevent inner-surface reflection for optical element |
|---|---|---|---|---|
| Coating material to prevent inner-surface reflection for optical element | First particle slurry | Material | Titania | Titania |
|  |  | Solvent | MIBK | MIBK |
|  |  | Solid content | 25 wt % | 25 wt % |
|  |  | Refractive index (solid content) | 2.7 | 2.7 |
|  |  | Average particle size | 20 nm | 20 nm |
|  |  | Model | ND106 | ND100 |
|  |  | Manufacturer | Tayca Corp. | Tayca Corp. |
|  |  | Amount added (g) | 70 | 70 |
|  |  | Solid content weight (g) | 17.5 | 17.5 |
|  | Colorant composed of organic substance soluble in organic solvent | Material | Dye | Dye |
|  |  | Type | B: Black dye<br>Y: Yellow dye<br>R: Red dye | B: Black dye<br>Y: Yellow dye<br>R: Red dye |
|  |  | Amount added (g) | B: 3<br>Y: 2.25<br>R: 0.75 | B: 3.4<br>Y: 1.7<br>R: 0.9 |
|  |  | Total amount added (g) | 6 | 6 |
|  | Second particle | Material | Silica | Silica |
|  |  | Average particle size | 10 μm | 1 μm |
|  |  | Model | Crystalite AA | Crystalite 5X |
|  |  | Manufacturer | Tatsumori Ltd. | Tatsumori Ltd. |
|  |  | Amount added (g) | 5 | 5 |
|  | Resin | Material | Epoxy | Epoxy |
|  |  | Amount added (g) | 10 | 10 |
|  | Solvent | Material | — | — |
|  |  | Amount added (g) | — | — |
|  | Coupling agent | Material | Epoxy-based silane coupling agent | Epoxy-based silane coupling agent |
|  |  | Amount added (g) | 3 | 3 |
|  | Curing agent | Material | Amine based | Amine based |
|  |  | Amount added (g) | 10 | 10 |
| Coating film to prevent inner-surface reflection for optical element | | First particle content (%) | 34.0 | 34.0 |
|  | | Second particle content (%) | 9.7 | 9.7 |

TABLE 3

|  |  |  | Example 1 | Example 2 | Example 3 |
|---|---|---|---|---|---|
| Evaluation of optical properties | Internal reflectance (Ave. 400-700 nm; %) | Incident angle after refraction: 68.13° | 5.99 | 9.38 | 5.83 |
|  |  | Incident angle after refraction: 45° | 0.14 | 0.12 | 0.13 |
|  |  | Incident angle after refraction: 36.73° | 0.56 | 0.30 | 0.75 |
|  | Surface reflection | Surface roughness (μm) | 3 | 3 | 3 |
|  |  | Surface reflectance (%) | 0.7 | 0.7 | 0.7 |
|  | Percentage by number of particle with size of 100 nm or more in first particle (%) | | 0.1 or less | 0.1 or less | 0.3 |
|  | Black level | | 0.8 | 0.7 | 0.8 |

TABLE 4

|  |  |  | Example 4 | Example 5 |
|---|---|---|---|---|
| Evaluation of optical properties | Internal reflectance (Ave. 400-700 nm; %) | Incident angle after refraction: 68.13° | 5.85 | 6.30 |
|  |  | Incident angle after refraction: 45° | 0.11 | 0.22 |
|  |  | Incident angle after refraction: 36.73° | 0.38 | 1.02 |
|  | Surface reflection | Surface roughness (μm) | 7 | 3 |
|  |  | Surface reflectance (%) | 0.1 | 0.7 |
|  | Percentage by number of particle with size of 100 nm or more in first particle (%) | | 0.1 or less | 0.1 or less |
|  | Black level | | 0.8 | 0.6 |

Comparative Examples 1 to 6

In Comparative Examples, the preparation of antireflection coating materials, the production of antireflection coating films, and the evaluation of optical properties were performed as in Examples 1 to 5. Differences between the comparative examples and the examples are described below.

Tables 5 and 6 illustrate first-particle slurries or coal tar, second particles, a resin, a coupling agent, and mixing ratios thereof, these components being contained in antireflection coating materials F, G, H, I, J, and K.

Tables 7 and 8 illustrate the evaluation results of optical properties of the antireflection coating materials F, G, H, I, J, and K according to Comparative Examples 1 to 6.

In Comparative Example 1, the antireflection coating material F in which coal tar was used in place of the first-particle slurry was used. Coal tar is a brownish material and has sufficient absorption of light in the wavelength range of about 400 nm to about 600 nm. However, coal tar has low absorption at about 700 nm and a relatively low refractive index. As a result, in the resulting antireflection coating film according to Comparative Example 1, when the incident angle after refraction was 68.13°, the inner-surface reflection was specifically poor. However, when the incident angles after refraction were 45° and 36.73°, the inner-surface reflection was satisfactory because particles were not used. Telephoto lens elements including the antireflection coating films were assembled into a telephoto lens. The visual evaluation of the resulting image demonstrated that flare and a ghost image were slightly observed.

In Comparative Example 2, the antireflection coating material G in which titania fine particles were used as the first-particle slurry was used. The titania fine particles were dispersed in a solvent to prepare a slurry by the following method. First, 15 g of titania fine particles, 85 g of MIBK, and a dispersant (DISPER BYK-106, manufactured by BYK Japan KK) were mixed using a planetary mixer (AR250, manufactured by Thinky Corporation) for 90 minutes at a rotation speed of 2000 rpm and a revolution speed of 66 rpm to prepare 15% by weight of the first-particle slurry. In the resulting antireflection coating film according to Comparative Example 2, the percentage by number of the fine-particle aggregates having a size of 100 nm or more was as relatively large as 0.5%. This resulted in an increase in the reflection of the refracted light, so that the inner-surface reflection of the antireflection coating film according to Comparative Example 2 was degraded when the incident angles after refraction were 45° and 36.73°. Telephoto lens elements including the antireflection coating films were assembled into a telephoto lens. The evaluation of the resulting image demonstrated that flare and a ghost image were observed.

In Comparative Example 3, the antireflection coating material H in which silica was used as the first particles was used. The refractive index nd of the silica particles is as low as 1.45. As a result, the internal reflectance of the antireflection coating film according to Comparative Example 3 was very bad at all angles. Telephoto lens elements including the antireflection coating films were assembled into a telephoto lens. The evaluation of the resulting image demonstrated that flare and a ghost image were observed.

In Comparative Example 4, the antireflection coating material I in which organic pigments were used as colorants was used. The organic pigments were not dissolved in the organic solvent for the coating material, thereby reducing the efficiency of absorption. As a result, the inner-surface reflection of the antireflection coating film according to Comparative Example 4 was particularly degraded when the incident angles after refraction were 45° and 36.73°. Telephoto lens elements including the antireflection coating films were assembled into a telephoto lens. The visual evaluation of the resulting image demonstrated that flare and a ghost image were slightly observed.

In Comparative Example 5, the coating material J in which silica particles having an average particle size of 10 nm were used as the second particles was used. The small particle size of the silica particles causes the adsorption of the second particles on the first particles, thereby failing to increase the refractive index. As a result, the inner-surface reflection of the antireflection coating film according to Comparative Example 5 was relatively poor. The internal reflectance was 30% at an incident angle of 68.13°. Telephoto lens elements including the antireflection coating films were assembled into a telephoto lens. The visual evaluation of the resulting image demonstrated that flare and a ghost image were slightly observed.

In Comparative Example 6, the antireflection coating material K including the second particles having an average particle size of 15 μm was used. An excessively large size of the second particles leads to an increase in surface roughness to reduce the appearance. Furthermore, the thickness can be out of tolerance. As a result, the surface roughness Ra of the antireflection coating film according to Comparative Example 6 was 10 μm, which was poor. Telephoto lens elements including the antireflection coating films were assembled into a telephoto lens. The evaluation of the resulting image demonstrated that flare and a ghost image were not observed. However, the antireflection coating film was poor in appearance.

TABLE 5

|  |  |  | Coating material and film F to prevent inner-surface reflection for optical element | Coating material and film G to prevent inner-surface reflection for optical element | Coating material and film H to prevent inner-surface reflection for optical element |
| --- | --- | --- | --- | --- | --- |
| Coating material to prevent inner-surface reflection for optical element | First particle slurry | Material | Coal tar | Titania | Silica |
|  |  | Solvent | — | MIBK | 10 nm |
|  |  | Solid content | 100% | 15 wt % | 100% |
|  |  | Refractive index (solid content) | 1.8 | 3 | 1.45 |
|  |  | Average particle size | — | 40 nm | 10 nm |
|  |  | Model | Tarcron 180 | MT-100S | Aerosil 200 |
|  |  | Manufacturer | — | Tayca Corp. | Nippon Aerosil Co., Ltd. |
|  |  | Amount added (g) | 15 | 90 | 70 |
|  |  | Solid content weight (g) | 15 | 13.5 | 70 |

TABLE 5-continued

|  |  |  | Coating material and film F to prevent inner-surface reflection for optical element | Coating material and film G to prevent inner-surface reflection for optical element | Coating material and film H to prevent inner-surface reflection for optical element |
|---|---|---|---|---|---|
|  | Colorant composed of organic substance soluble in organic solvent | Material | — | — | Dye |
|  |  | Type | — | B: Black dye<br>Y: Yellow dye<br>R: Red dye | B: Black dye<br>Y: Yellow dye<br>R: Red dye |
|  |  | Amount added (g) | — | B: 3<br>Y: 2.25<br>R: 0.75 | B: 3<br>Y: 2.25<br>R: 0.75 |
|  |  | Total amount added (g) | 0 | 6 | 6 |
|  | Second particle | Material | Silica | Silica | Silica |
|  |  | Average particle size | 1 μm | 1 μm | 1 μm |
|  |  | Model | Crystalite 5X | Crystalite 5X | Crystalite 5X |
|  |  | Manufacturer | Tatsumori Ltd. | Tatsumori Ltd. | Tatsumori Ltd. |
|  |  | Amount added (g) | 5 | 5 | 5 |
|  | Resin | Material | Epoxy | Epoxy | Epoxy |
|  |  | Amount added (g) | 10 | 10 | 10 |
|  | Solvent | Material | Thinner | — | — |
|  |  | Amount added (g) | 50 | — | — |
|  | Coupling agent | Material | Epoxy-based silane coupling agent | Epoxy-based silane coupling agent | Epoxy-based silane coupling agent |
|  |  | Amount added (g) | 3 | 3 | 3 |
|  | Curing agent | Material | Amine based | Amine based | Amine based |
|  |  | Amount added (g) | 10 | 10 | 10 |
| Coating film to prevent inner-surface reflection for optical element | First particle content (%) |  | 34.9 | 28.4 | 67.3 |
|  | Second particle content (%) |  | 11.6 | 10.5 | 4.8 |

TABLE 6

|  |  |  | Coating material and film I to prevent inner-surface reflection for optical element | Coating material and film J to prevent inner-surface reflection for optical element | Coating material and film K to prevent inner-surface reflection for optical element |
|---|---|---|---|---|---|
| Coating material to prevent inner-surface reflection for optical element | First particle slurry | Material | Titania | Titania | Titania |
|  |  | Solvent | MIBK | MIBK | MIBK |
|  |  | Solid content | 25 wt % | 25 wt % | 25 wt % |
|  |  | Refractive index (solid content) | 2.7 | 2.7 | 2.7 |
|  |  | Average particle size | 20 nm | 20 nm | 20 nm |
|  |  | Model | ND100 | ND100 | ND100 |
|  |  | Manufacturer | Tayca Corp. | Tayca Corp. | Tayca Corp. |
|  |  | Amount added (g) | 70 | 70 | 70 |
|  |  | Solid content weight (g) | 17.5 | 17.5 | 17.5 |
|  | Colorant composed of organic substance soluble in organic solvent | Material | Organic pigment | Dye | Dye |
|  |  | Type | Y: Yellow pigment<br>R: Red pigment<br>B: Blue pigment | B: Black dye<br>Y: Yellow dye<br>R: Red dye | B: Black dye<br>Y: Yellow dye<br>R: Red dye |
|  |  | Amount added (g) | Y: 2<br>R: 2<br>B: 2 | B: 3<br>Y: 2.25<br>R: 0.75 | B: 3<br>Y: 2.25<br>R: 0.75 |
|  |  | Total amount added (g) | 6 | 6 | 6 |
|  | Second particle | Material | Silica | Silica | Silica |
|  |  | Average particle size | 1 μm | 10 nm | 15 μm |
|  |  | Model | Crystalite 5X | Aerosil 200 | SMT-10 |
|  |  | Manufacturer | Tatsumori Ltd. | Nippon Aerosil Co., Ltd. | Tatsumori Ltd. |
|  |  | Amount added (g) | 5 | 5 | 5 |
|  | Resin | Material | Epoxy | Epoxy | Epoxy |
|  |  | Amount added (g) | 10 | 10 | 10 |
|  | Solvent | Material | — | — | — |
|  |  | Amount added (g) | — | — | — |

TABLE 6-continued

|  |  |  | Coating material and film I to prevent inner-surface reflection for optical element | Coating material and film J to prevent inner-surface reflection for optical element | Coating material and film K to prevent inner-surface reflection for optical element |
|---|---|---|---|---|---|
|  | Coupling agent | Material | Epoxy-based silane coupling agent | Epoxy-based silane coupling agent | Epoxy-based silane coupling agent |
|  |  | Amount added (g) | 3 | 3 | 3 |
|  | Curing agent | Material | Amine based | Amine based | Amine based |
|  |  | Amount added (g) | 10 | 10 | 10 |
| Coating film to prevent inner-surface reflection for optical element |  | First particle content (%) | 34.0 | 34.0 | 34.0 |
|  |  | Second particle content (%) | 9.7 | 9.7 | 9.7 |

TABLE 7

|  |  |  | Comparative Example 1 | Comparative Example 2 | Comparative Example 3 |
|---|---|---|---|---|---|
| Evaluation of optical properties | Internal reflectance (Ave. 400-700 nm; %) | Incident angle after refraction: 68.13° | 30.48 | 2.56 | 100.00 |
|  |  | Incident angle after refraction: 45° | 0.29 | 0.31 | 2.36 |
|  |  | Incident angle after refraction: 36.73° | 1.08 | 2.60 | 3.09 |
|  | Surface reflection | Surface roughness (μm) | 3 | 3 | 3 |
|  |  | Surface reflectance (%) | 0.5 | 0.7 | 0.1 |
|  | Percentage by number of particle with size of 100 nm or more in first particle (%) |  | — | 0.5 | 0.1 or less |
|  | Black level |  | 0.3 | 0.9 | 0.8 |

TABLE 8

|  |  |  | Comparative Example 4 | Comparative Example 5 | Comparative Example 6 |
|---|---|---|---|---|---|
| Evaluation of optical properties | Internal reflectance (Ave. 400-700 nm; %) | Incident angle after refraction: 68.13° | 8.81 | 30.09 | 5.83 |
|  |  | Incident angle after refraction: 45° | 0.77 | 0.29 | 0.11 |
|  |  | Incident angle after refraction: 36.73° | 2.86 | 2.44 | 0.37 |
|  | Surface reflection | Surface roughness (μm) | 3 | 3 | 10 |
|  |  | Surface reflectance (%) | 0.7 | 0.7 | 0.1 |
|  | Percentage by number of particle with size of 100 nm or more in first particle (%) |  | 0.1 or less | 0.1 or less | 0.1 or less |
|  | Black level |  | 0.7 | 0.8 | 0.8 |

Examples 6 to 13

In Examples 6 to 13, the preparation of light-shielding coating materials for optical elements, the production of light-shielding coating films for optical elements, and the evaluation of optical properties were performed by methods described below.

Preparation of Light-Shielding Coating Material for Optical Element

Tables 9 and 10 illustrate a resin, black pigments, non-black particles, a solvent, a coupling agent, a curing agent, and mixing ratios thereof, these components being contained in light-shielding coating materials R, S, T, U, V, W, X, and Y for optical elements. The light-shielding coating material and light-shielding coating film R for an optical element were used in Example 6. The light-shielding coating material and light-shielding coating film S for an optical element were used in Example 7. The light-shielding coating material and light-shielding coating film T for an optical element were used in Example 8. The light-shielding coating material and light-shielding coating film U for an optical element were used in Example 9. The light-shielding coating material and light-shielding coating film V for an optical element were used in Example 10. The light-shielding coating material and light-shielding coating film W for an optical element were used in Example 11. The light-shielding coating material and light-shielding coating film X for an optical element were used in Example 12. The light-shielding coating material and light-shielding coating film Y for an optical element were used in Example 13.

A method for preparing a light-shielding coating material for an optical element will be described in detail by taking the light-shielding coating material R as an example. First, 4 g of an epoxy resin Epikote 828, manufactured by Japan Epoxy Resins Co., Ltd.), 4 g of a black dye, 2.9 g of a red dye, 0.375 g of a yellow dye, 2 g of titania (ND 139, manufactured by Tayca Corp.), which is non-black particles, 24 g of a solvent (propylene glycol monomethyl ether, manufactured by Kishida Chemical Co., Ltd.), 1.2 g of a coupling agent (KBM-403, manufactured by Shin-Etsu Chemical Co., Ltd.) were charged into a ball mill pot. Subsequently, five ceramic balls each having a diameter of 20 mm were charged into the ball mill pot. The ball mill pot containing the mixture and the ceramic balls was set to a roll coater and rotated at 66 rpm for 72 hours, thereby preparing a light-shielding coating material for an optical element.

Dyes used were selected from dyes described below.

The black dye used was selected from VALIFAST BLACK 1821 (manufactured by Orient Chemical Industries Co., Ltd.), VALRFAST BLACK 3810 (manufactured by Orient Chemical Industries Co., Ltd.), Oil Black HBB (manufactured by Orient Chemical Industries Co., Ltd.), and Aizen Spilon Black MHS-Liquid (manufactured by Hodogaya Chemical Co., Ltd).

The red dye used was selected from VALIFAST RED 3320 (manufactured by Orient Chemical Industries Co., Ltd.) and Aizen Spilon Red BEH S-liquid (manufactured by Hodogaya Chemical Co., Ltd).

The yellow dye used was selected from OIL YELLOW 129, VALIFAST YELLOW 3108, and Aizen Spilon Yellow RH S-Liquid (manufactured by Hodogaya Chemical Co., Ltd).

[Production of Light-Shielding Coating Film for Optical Element]

A light-shielding coating film is formed from the light-shielding coating material. Here, 4 g of a curing agent (Adeka Hardener EH551CH, manufactured by Adeka Corporation) was added to the total amount of the light-shielding coating material for an optical element. The resulting mixture was agitated with a roll coater for 30 minutes at 66 rpm.

The resulting mixture containing the light-shielding coating material for an optical element and the curing agent was applied on a prism for evaluation in such a manner that the thickness was 2 µm, and then dried at room temperature for 60 minutes. After the completion of the drying of the light-shielding coating material for an optical element, curing was performed in an oven at 80° C. for 120 minutes, thereby forming a light-shielding coating film for an optical element.

Evaluation of Optical Properties
Method for Measuring Average Extinction Coefficient A sample for the measurement of an average extinction coefficient was produced by forming a light-shielding coating film for an optical element on a flat glass plate. The flat glass plate had a width of 20 mm, a length of 50 mm, and a thickness of 1 mm and was composed of clear glass. The light-shielding coating film for an optical element was formed on an upper surface of the flat glass plate. In this case, the thickness of the light-shielding coating film was adjusted to 1 µm. Next, the transmittance was measured with a spectrophotometer (U-4000, manufactured by Hitachi High-Technologies Corporation). The transmittance of the flat glass plate was defined as 100%. The transmittance of the sample including the light-shielding coating film prepared to measure the extinction coefficient was measured in the visible wavelength range of 400 nm to 700 nm at intervals of 1 nm. Furthermore, the average transmittance of the sample including the light-shielding coating film prepared to measure the extinction coefficient was calculated by dividing the sum of the values of the transmittance in the range of 400 nm to 700 nm by 300, which was the number of data values.

After the average transmittance I was measured with the spectrophotometer, the extinction coefficient was calculated from expressions (6), (7), and (8). OD in expression (6) represents an absorbance value obtained by dividing the average transmittance I by $I_0$ as 100% transmittance and taking the negative logarithm of the resulting value. The absorption constant α in expression (7) represents the amount of light absorbed per unit length and is obtained by dividing the absorbance OD by the thickness L of the light-shielding coating film. The extinction coefficient k in expression (8) is a value obtained by multiplying α by a wavelength λ in order to form the absorption constant α into a dimensionless value.

$$OD = -\log(I/I_0) \qquad \text{expression (6)}$$

$$\alpha = 2.303 \times OD/L \qquad \text{expression (7)}$$

$$k = \alpha \times \lambda / 4\pi \qquad \text{expression (8)}$$

Method for Measuring Internal Reflectance

The internal reflectance was measured as in Examples 1 to 5.

Method for Measuring Surface Reflection

The surface reflectance was measured as in Examples 1 to 5.

Method for Measuring Surface Roughness

The surface roughness was measured as in Examples 1 to 5.

Percentage by Number of Particle with Size of 100 nm or More

The percentage by number of particles with a size of 100 nm or more was measured as in Examples 1 to 5.

Method for Measuring Black Level

The black level was measured as in Examples 1 to 5.

Evaluation Method of Appearance

Figure 6:
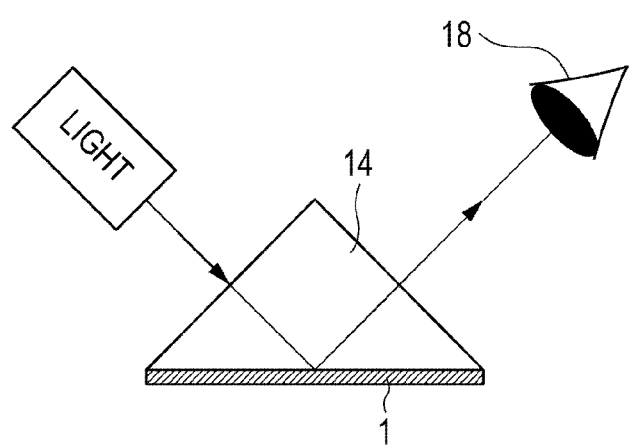
FIG. 6 is a schematic view illustrating a method for evaluating the appearance of a triangular prism.

As illustrated in FIG. 6, the appearance was evaluated by irradiation with light from an irradiator at 60 W. A triangular prism 14 was used as a measurement sample. In the triangular prism, a side that forms a right angle with a side was 30 mm, and the thickness was 10 mm. The prism 14 was composed of S-LAH 53 (nd=1.805). A light-shielding coating film was formed on the bottom surface of the triangular prism 14. Light was allowed to impinge on the light-shielding coating film. The resulting reflected light was observed by human eyes 18. Roughness and the tone of color were evaluated.

Performance when Lens Elements Including Light-Shielding Coating Films are Incorporated into Lens Barrel Performance when a lens including the light-shielding coating film is incorporated into a lens barrel was evaluated as in Examples 1 to 5.

TABLE 9

| | | | Light-shielding coating material and light-shielding coating film R for optical element | Light-shielding coating material and light-shielding coating film S for optical element | Light-shielding coating material and light-shielding coating film T for optical element | Light-shielding coating material and light-shielding coating film U for optical element |
|---|---|---|---|---|---|---|
| Light-shielding coating material for optical element | Resin | Material | Epoxy | Epoxy | Epoxy | Epoxy |
| | | Amount added (g) | 4 | 4 | 4 | 4 |
| | Inorganic black particle with refractive index of 2.2 to 3.5 for d line | Material | Carbon black-coated titania | Carbon black-coated zirconia | Titanium black-coated titania | Titanium black-coated zirconia |
| | | Refractive index for d-line | 2.5 | 2.2 | 2.5 | 2.2 |
| | | Particle size (nm) | 20 | 20 | 20 | 20 |
| | | Amount added (solid content weight) (g) | 1.5 | 10.9 | 1.5 | 1.5 |
| | Solvent | Material | Propylene glycol monomethyl ether | Propylene glycol monomethyl ether | Propylene glycol monomethyl ether | Propylene glycol monomethyl ether |
| | | Amount added (g) | 24 | 24 | 24 | 24 |
| | Coupling agent | Material | Epoxy-based silane coupling agent | Epoxy-based silane coupling agent | Epoxy-based silane coupling agent | Epoxy-based silane coupling agent |
| | | Amount added (g) | 1.2 | 1.2 | 1.2 | 1.2 |
| | Surface reflection-preventing agent | Material | A: Nanosized silica (hydrophilic) B: Nanosized silica (hydrophobic) C: Sericite D: Quartz | A: Nanosized silica (hydrophilic) B: Nanosized silica (hydrophobic) C: Sericite D: Quartz | A: Nanosized silica (hydrophilic) B: Nanosized silica (hydrophobic) C: Sericite D: Quartz | A: Nanosized silica (hydrophilic) B: Nanosized silica (hydrophobic) C: Sericite D: Quartz |
| | | Amount added (g) | A: 1.6 B: 0.7 C: 0.8 D: 1.0 | A: 1.6 B: 0.7 C: 0.8 D: 1.0 | A: 1.6 B: 0.7 C: 0.8 D: 1.0 | A: 1.6 B: 0.7 C: 0.8 D: 1.0 |
| | | Total amount added (g) | 4.1 | 4.1 | 4.1 | 4.1 |
| | Curing agent | Material | Amine based | Amine based | Amine based | Amine based |
| | | Amount added (g) | 4 | 4 | 4 | 4 |
| Light-shielding coating film for optical element | Inorganic black particle with refractive index of 2.2 to 3.5 for d-line (%) | | 10 | 45 | 10 | 10 |
| | Thickness (μm) | | 5 | 5 | 5 | 5 |

TABLE 10

| | | | Light-shielding coating material and light-shielding coating film V for optical element | Light-shielding coating material and light-shielding coating film W for optical element | Light-shielding coating material and light-shielding coating film X for optical element | Light-shielding coating material and light-shielding coating film Y for optical element |
|---|---|---|---|---|---|---|
| Light-shielding coating material for optical element | Resin | Material | Epoxy | Epoxy | Epoxy | Epoxy |
| | | Amount added (g) | 4 | 4 | 4 | 4 |
| | Inorganic black particle with refractive index of 2.2 to 3.5 for d line | Material | TiN | TiN | TiN | TiN |
| | | Refractive index for d-line | 3.5 | 3.5 | 3.5 | 3.5 |
| | | Particle size (nm) | 20 | 100 | 20 | 20 |
| | | Amount added (solid content weight) (g) | 1.8 | 1.8 | 11 | 1.8 |
| | Solvent | Material | Propylene glycol monomethyl ether | Propylene glycol monomethyl ether | Propylene glycol monomethyl ether | Propylene glycol monomethyl ether |
| | | Amount added (g) | 24 | 24 | 24 | 24 |
| | Coupling agent | Material | Epoxy-based silane coupling agent | Epoxy-based silane coupling agent | Epoxy-based silane coupling agent | Epoxy-based silane coupling agent |
| | | Amount added (g) | 1.2 | 1.2 | 1.2 | 1.2 |

TABLE 10-continued

|  |  | Light-shielding coating material and light-shielding coating film V for optical element | Light-shielding coating material and light-shielding coating film W for optical element | Light-shielding coating material and light-shielding coating film X for optical element | Light-shielding coating material and light-shielding coating film Y for optical element |
|---|---|---|---|---|---|
|  | Surface reflection-preventing agent | Material | A: Nanosized silica (hydrophilic) B: Nanosized silica (hydrophobic) C: Sericite D: Quartz | A: Nanosized silica (hydrophilic) B: Nanosized silica (hydrophobic) C: Sericite D: Quartz | A: Nanosized silica (hydrophilic) B: Nanosized silica (hydrophobic) C: Sericite D: Quartz | A: Nanosized silica (hydrophilic) B: Nanosized silica (hydrophobic) C: Sericite D: Quartz |
|  |  | Amount added (g) | A: 1.6 B: 0.7 C: 0.8 D: 1.0 | A: 1.6 B: 0.7 C: 0.8 D: 1.0 | A: 1.6 B: 0.7 C: 0.8 D: 1.0 | A: 1.6 B: 0.7 C: 0.8 D: 1.5 |
|  |  | Total amount added (g) | 4.1 | 4.1 | 4.1 | 4.1 |
|  | Curing agent | Material | Amine based | Amine based | Amine based | Amine based |
|  |  | Amount added (g) | 4 | 4 | 4 | 4 |
| Light-shielding coating film for optical element | Inorganic black particle with refractive index of 2.2 to 3.5 for d-line (%) | | 12 | 12 | 45 | 12 |
|  | Thickness (μm) | | 5 | 5 | 5 | 5 |

(Note 1) Appearance
Excellent: The tint of color is acceptable, and there is no roughness.
Good: The tint of color of a single lens is slightly poor but is imperceptible when the lens is incorporated into a lens barrel. Alternatively, roughness is observed but is imperceptible when the lens is incorporated into a lens barrel.
(Note 2) Performance when Lens Elements Including Light-Shielding Coating Films are Incorporated into Lens Barrel
Excellent: Flare and a ghost image are not formed.
Good: Although flare and a ghost image are not formed, a defect in which the lens elements are not attached to the lens barrel can occur.
Poor: Flare and a ghost image are formed.
Evaluation Result The internal reflectance, the black level, the surface roughness, the surface reflectance, and the appearance of the coating materials and coating films R, S, T, U, V, W, X, and Y for optical elements were evaluated by the measurement methods. The performance when the lens elements including the light-shielding coating films were incorporated into the lens barrel was also evaluated.

With respect to the measurement results, the internal reflectance may be 0.05% or less when the incident angle after refraction is 36.73°. The internal reflectance may be 0.07% or less when the incident angle after refraction is 45°. The internal reflectance may be 1% or less when the incident angle after refraction is 68.13°. The black level may be 0.7 or more.

Table 11 illustrates the physical properties of the light-shielding coating material and the light-shielding coating film R according to Example 6, in which carbon black-coated titania having a particle size of 20 nm was used as the colorant in an amount of 10% by weight. The internal reflectance at incident angles of 36.73°, 45°, and 68.13° was satisfactory. The black level was satisfactory. With respect to the appearance, although roughness was observed, the tint of color was satisfactory. The surface roughness and the surface reflectance were satisfactory. Telephoto lens elements including the light-shielding coating films were assembled into a telephoto lens. The evaluation of the resulting image demonstrated that flare and a ghost image were not observed.

Table 11 illustrates the physical properties of the light-shielding coating material and the light-shielding coating film S according to Example 7, in which carbon black-coated zirconia having a particle size of 20 nm was used as the colorant in an amount of 45% by weight. The internal reflectance at incident angles of 36.73°, 45°, and 68.13° was satisfactory. The black level was satisfactory. With respect to the appearance, although roughness was observed, the tint of color was satisfactory. The surface roughness and the surface reflectance were satisfactory. Telephoto lens elements including the light-shielding coating films were assembled into a telephoto lens. The evaluation of the resulting image demonstrated that flare and a ghost image were not observed.

Table 11 illustrates the physical properties of the light-shielding coating material and the light-shielding coating film T according to Example 8, in which titanium black-coated titania having a particle size of 20 nm was used as the colorant in an amount of 10% by weight. The internal reflectance at incident angles of 36.73°, 45°, and 68.13° was satisfactory. The black level was satisfactory. With respect to the appearance, although roughness was observed, the tint of color was satisfactory. The surface roughness and the surface reflectance were satisfactory. Telephoto lens elements including the light-shielding coating films were assembled into a telephoto lens. The evaluation of the resulting image demonstrated that flare and a ghost image were not observed.

Table 11 illustrates the physical properties of the light-shielding coating material and the light-shielding coating film U according to Example 9, in which carbon black-coated zirconia having a particle size of 20 nm was used as the colorant in an amount of 10% by weight. The internal reflectance at incident angles of 36.73°, 45°, and 68.13° was satisfactory. The black level was satisfactory. With respect to the appearance, although roughness was observed, the tint of color was satisfactory. The surface roughness and the surface reflectance were satisfactory. Telephoto lens elements including the light-shielding coating films were assembled into a telephoto lens. The evaluation of the resulting image demonstrated that flare and a ghost image were not observed.

Table 12 illustrates the physical properties of the light-shielding coating material and the light-shielding coating film V according to Example 10, in which TiN having a particle size of 20 nm was used as the colorant in an amount of 12% by weight. The internal reflectance at incident angles of 36.73°, 45°, and 68.13° was satisfactory. The black level was satisfactory. With respect to the appearance, although roughness was observed, the tint of color was satisfactory. The surface roughness and the surface reflectance were satisfactory. Telephoto lens elements including the light-shielding coating films were assembled into a telephoto lens. The evaluation of the resulting image demonstrated that flare and a ghost image were not observed.

Table 12 illustrates the physical properties of the light-shielding coating material and the light-shielding coating film W according to Example 11, in which TiN having a particle size of 100 nm was used as the colorant in an amount of 12% by weight. The internal reflectance at incident angles of 36.73°, 45°, and 68.13° was satisfactory. The black level was satisfactory. With respect to the appearance, although roughness was observed, the tint of color was satisfactory. The surface roughness and the surface reflectance were satisfactory. Telephoto lens elements including the light-shielding coating films were assembled into a telephoto lens. The evaluation of the resulting image demonstrated that flare and a ghost image were not observed.

Table 12 illustrates the physical properties of the light-shielding coating material and the light-shielding coating film Y according to Example 13, in which TiN having a particle size of 110 nm was used as the colorant in an amount of 12% by weight. The internal reflectance at incident angles of 36.73°, 45°, and 68.13° was satisfactory. The black level was satisfactory. The surface roughness and the surface reflectance were satisfactory. The black level was satisfactory. With respect to the appearance, although roughness was observed, the tint of color was satisfactory. Telephoto lens elements including the light-shielding coating films were assembled into a telephoto lens. The evaluation of the resulting image demonstrated that flare and a ghost image were not observed.

TABLE 11

| | | | Example 6 | Example 7 | Example 8 | Example 9 |
|---|---|---|---|---|---|---|
| Evaluation of optical properties | | Extinction coefficient | 0.03 | 0.15 | 0.03 | 0.03 |
| | Internal reflectance (Ave. 400-700 nm; %) | Incident angle after refraction: 68.13° | 0.29 | 0.88 | 0.31 | 0.92 |
| | | Incident angle after refraction: 45° | 0.03 | 0.04 | 0.03 | 0.03 |
| | | Incident angle after refraction: 36.73° | 0.02 | 0.03 | 0.02 | 0.02 |
| | Black level | | 1 | 1 | 1 | 1 |
| | Appearance | | Good | Good | Good | Good |
| | Performance When Lens elements Including Light-Shielding Coating Films Are Incorporated into Lens Barrel | | Excellent | Excellent | Excellent | Excellent |

TABLE 12

| | | | Example 10 | Example 11 | Example 12 | Example 13 |
|---|---|---|---|---|---|---|
| Evaluation of optical properties | | Extinction coefficient | 0.03 | 0.03 | 0.15 | 0.03 |
| | Internal reflectance (Ave. 400-700 nm; %) | Incident angle after refraction: 68.13° | 0.18 | 0.21 | 0.11 | 0.2 |
| | | Incident angle after refraction: 45° | 0.03 | 0.04 | 0.04 | 0.07 |
| | | Incident angle after refraction: 36.73° | 0.02 | 0.03 | 0.03 | 0.05 |
| | Black level | | 1 | 1 | 1 | 1 |
| | Appearance | | Good | Good | Good | Good |
| | Performance When Lens elements Including Light-Shielding Coating Films Are Incorporated into Lens Barrel | | Excellent | Excellent | Excellent | Excellent |

The surface roughness and the surface reflectance were satisfactory. Telephoto lens elements including the light-shielding coating films were assembled into a telephoto lens. The evaluation of the resulting image demonstrated that flare and a ghost image were not observed.

Table 12 illustrates the physical properties of the light-shielding coating material and the light-shielding coating film X according to Example 12, in which TiN having a particle size of 20 nm was used as the colorant in an amount of 45% by weight. The internal reflectance at incident angles of 36.73°, 45°, and 68.13° was satisfactory. The black level was satisfactory. With respect to the appearance, although While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-029513, filed Feb. 12, 2010, and Japanese Patent Application No. 2011-002164, filed Jan. 7, 2011, which are hereby incorporated by reference herein in their entirety.

The invention claimed is:

1. An optical coating film for an optical element, the optical coating film being formed on the surface of a substrate composed of an optical material, the optical coating film comprising:
   first particles at least having a refractive index (nd) of 2.2 to 3.5 for the d-line and an average particle size of 10 nm to 70 nm;
   second particles composed of at least one of silica and sericite,
   a colorant; and
   a resin,
   wherein a first particle content with respect to the optical coating film is in the range of 10% by weight to 35% by weight, and a second particle content with respect to the optical coating film is in the range of 1% by weight to 11% by weight,
   wherein the optical coating film is a light-shielding coating film, and
   wherein a ratio of the minimum absorbance to the maximum absorbance (minimum absorbance/maximum absorbance) of the optical coating film for the optical element in the wavelength range of 400 nm to 700 nm is 0.7 or more.

2. The optical coating film for the optical element according to claim 1,
   wherein the percentage by number of particles having a particle size of 100 nm or more in the first particles is 0.3% or less.

3. The optical coating film for the optical element according to claim 1,
   wherein the first particles contain at least one of titania and zirconia.

4. The optical coating film for the optical element according to claim 1,
   wherein the colorant is a dye.

5. The optical coating film for the optical element according to claim 1,
   wherein the particle sizes of the second particles are larger than the particle sizes of the first particles.

6. The optical coating film for the optical element according to claim 1,
   wherein the colorant content with respect to the optical coating film is in the range of 30% by weight to 80% by weight.

7. The optical coating film for the optical element according to claim 1,
   wherein the inner-surface reflectance of the optical coating film is 20% or less when the incident angle is 68.13°, 0.2% or less when the incident angle is 45° and 1.0% or less when the incident angle is 36.73°.

8. The optical coating film for the optical element according to claim 1,
   wherein the surface reflectance of the optical coating film on a surface of the optical coating film opposite to a surface of the optical coating film contacting the substrate is 0.7 or less.

9. An optical coating film material for an optical element, comprising:
   an organic solvent;
   first particles having a refractive index (nd) of 2.2 to 3.5 for the d-line and an average particle size of 10 nm to 70 nm;
   second particles composed of at least one of silica and sericite,
   a colorant soluble in the organic solvent; and
   a resin,
   wherein with respect to a solid content excluding the organic solvent, a first particle content is in the range of 10% by weight to 35% by weight, and a second particle content is in the range of 1% by weight to 11% by weight,
   wherein the optical coating film material is a light-shielding coating and
   wherein a ratio of the minimum absorbance to the maximum absorbance (minimum absorbance/maximum absorbance) of the optical coating film material for the optical element in the wavelength range of 400 nm to 700 nm is 0.7 or more.

10. An optical element comprising:
    a substrate composed of an optical material; and
    an optical coating film being provided on a portion of a circumferential surface of the substrate,
    the optical coating film comprising:
       first particles having a refractive index (nd) of 2.2 to 3.5 for the d-line and an average particle size of 10 nm to 70 nm;
       second particles composed of at least one of silica and sericite,
       a colorant; and
       a resin,
    wherein a first particle content with respect to the optical coating film is in the range of 10% by weight to 35% by weight, and a second particle content with respect to the optical coating film is in the range of 1% by weight to 11% by weight,
    wherein the optical coating film is a light-shielding coating film, and
    wherein a ratio of the minimum absorbance to the maximum absorbance (minimum absorbance/maximum absorbance) of the optical coating film for an optical element in the wavelength range of 400 nm to 700 nm is 0.7 or more.

11. The optical element according to claim 10,
    wherein the percentage by number of particles having a particle size of 100 nm or more in the first particles is 0.3% or less.

12. The optical element according to claim 10,
    wherein the first particles contain at least one of titania and zirconia.

13. The optical element according to claim 10,
    wherein the colorant is a dye.

14. The optical element according to claim 10,
    wherein the particle sizes of the second particles are larger than the particle sizes of the first particles.

15. The optical element according to claim 10,
    wherein the colorant content with respect to the optical coating film is in the range of 30% by weight to 80% by weight.

16. The optical element according to claim 10,
    wherein the inner-surface reflectance of the optical coating film is 20% or less when the incident angle is 68.13°, 0.2% or less when the incident angle is 45° and 1.0% or less when the incident angle is 36.73°.

17. The optical element according to claim 10,
    wherein the surface reflectance of the optical coating film on a surface of the optical coating film opposite to a surface of the optical coating film contacting the substrate is 0.7 or less.

18. The optical coating film for the optical element according to claim 1,
wherein inner-surface reflectance of the optical coating film is 20% or less when an incident angle is 68.13°.

* * * * *